US010837407B2

(12) United States Patent
Fuller et al.

(10) Patent No.: US 10,837,407 B2
(45) Date of Patent: Nov. 17, 2020

(54) LIQUID FUEL METERING IN A HYBRID ROCKET-LIKE LIQUID ROCKET MOTOR

(71) Applicants: Jerome Keith Fuller, Lake Balboa, CA (US); John D DeSain, Redondo Beach, CA (US)

(72) Inventors: Jerome Keith Fuller, Lake Balboa, CA (US); John D DeSain, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 597 days.

(21) Appl. No.: 15/343,296

(22) Filed: Nov. 4, 2016

(65) Prior Publication Data

US 2017/0130674 A1    May 11, 2017

Related U.S. Application Data

(60) Provisional application No. 62/251,848, filed on Nov. 6, 2015.

(51) Int. Cl.
| *F02K 9/72* | (2006.01) |
| *F02K 9/60* | (2006.01) |
| *F02K 9/10* | (2006.01) |
| *B64G 1/40* | (2006.01) |
| *F02K 9/12* | (2006.01) |
| *F02K 9/16* | (2006.01) |

(52) U.S. Cl.
CPC ............... *F02K 9/72* (2013.01); *B64G 1/403* (2013.01); *B64G 1/404* (2013.01); *F02K 9/10* (2013.01); *F02K 9/12* (2013.01); *F02K 9/16* (2013.01); *F02K 9/605* (2013.01)

(58) Field of Classification Search
CPC .......... B64G 1/403; B64G 1/404; F02K 9/10; F02K 9/12; F02K 9/16; F02K 9/72
See application file for complete search history.

(56) References Cited

U.S. PATENT DOCUMENTS

| 9,038,368 | B2 * | 5/2015 | Fuller | ...................... F02K 9/12 60/255 |
| 2002/0036038 | A1 * | 3/2002 | Karabeyoglu | .......... C06B 47/02 149/19.9 |
| 2013/0031888 | A1 * | 2/2013 | Fuller | ...................... F02K 9/12 60/255 |

OTHER PUBLICATIONS

Kim, Jaewoo; Experimental Investigations of the Tapered Fuel Regression Rate of a Hybrid Rocket Motor; Jul. 2010; AIAA (Year: 2010).*

* cited by examiner

*Primary Examiner* — Todd E Manahan
*Assistant Examiner* — Kyle Robert Thomas
(74) *Attorney, Agent, or Firm* — LeonardPatelPC

(57) ABSTRACT

A hybrid-like liquid fuel motor (the "motor") may include a port surrounded by a wall. Surrounding the wall are a plurality of chambers and segmented walls to separate the chambers. In some instances, a single helix chamber may surround the wall, and may operate similar to that of a segmental chamber. During operation of the motor, gas flows from one end of the port to another end of the port. As the walls surrounding the port begin to disintegrate, liquid fuel within chambers begins to begin to mix with the flow of gas. As the segmented walls between the chambers begin to disintegrate, liquid from the other chambers begin to mix with the flow of gas, creating a metering of the liquid fuel.

18 Claims, 21 Drawing Sheets

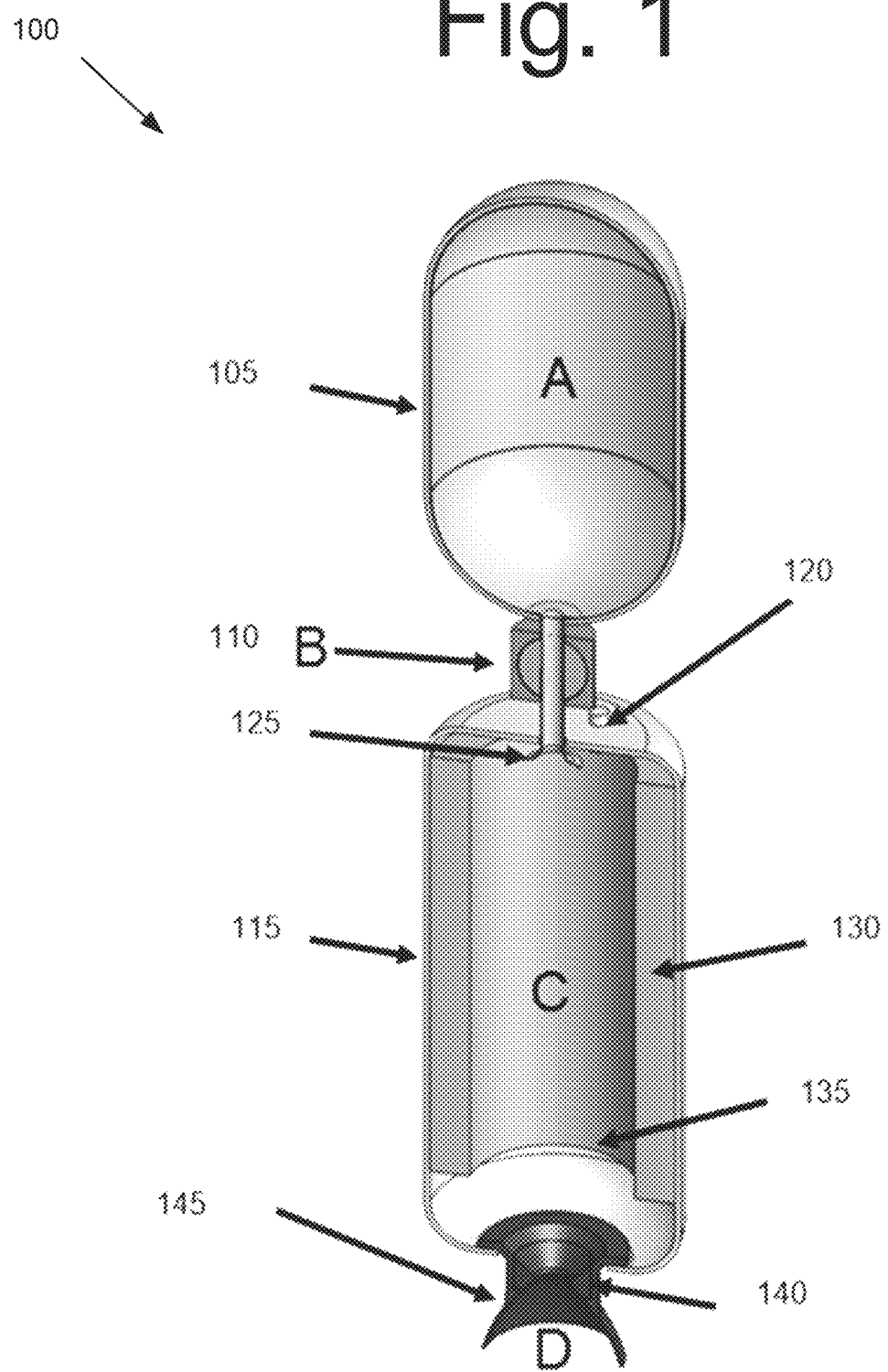

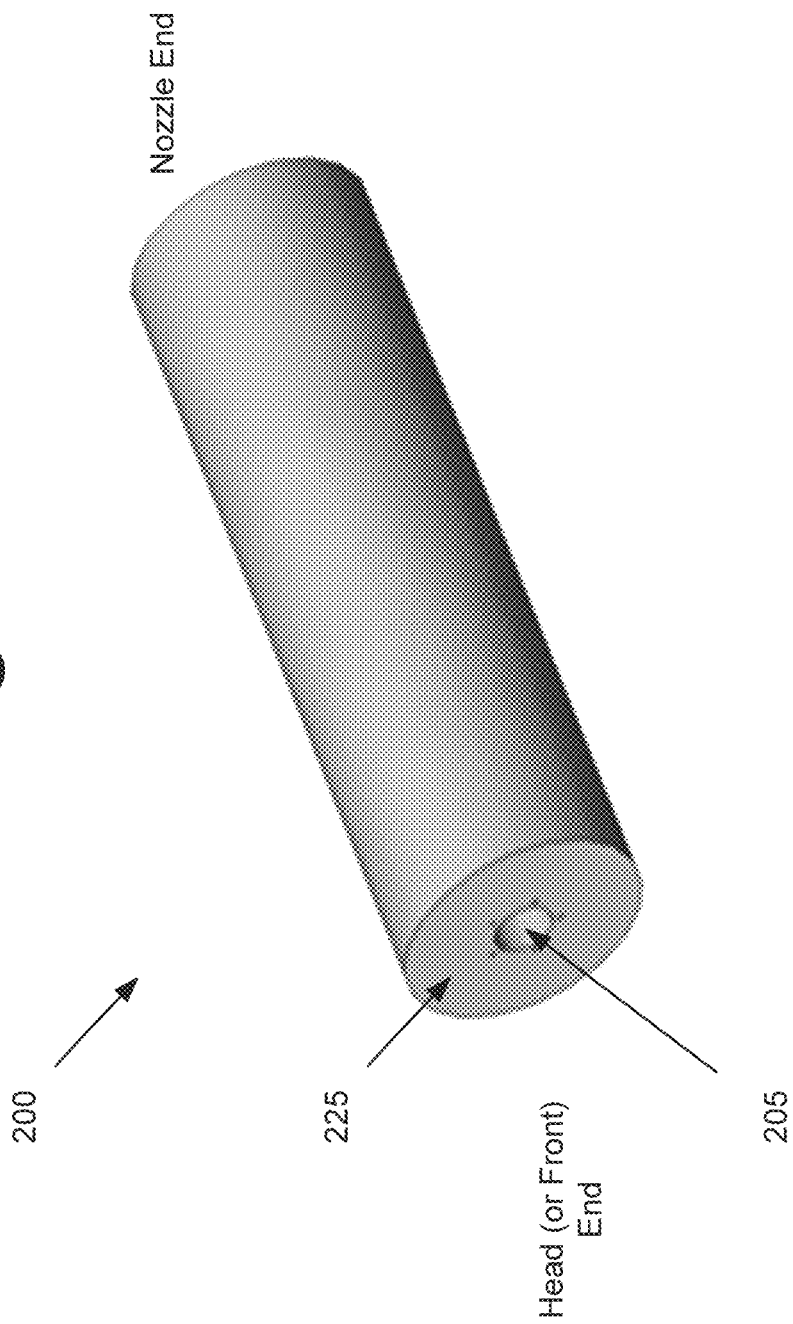

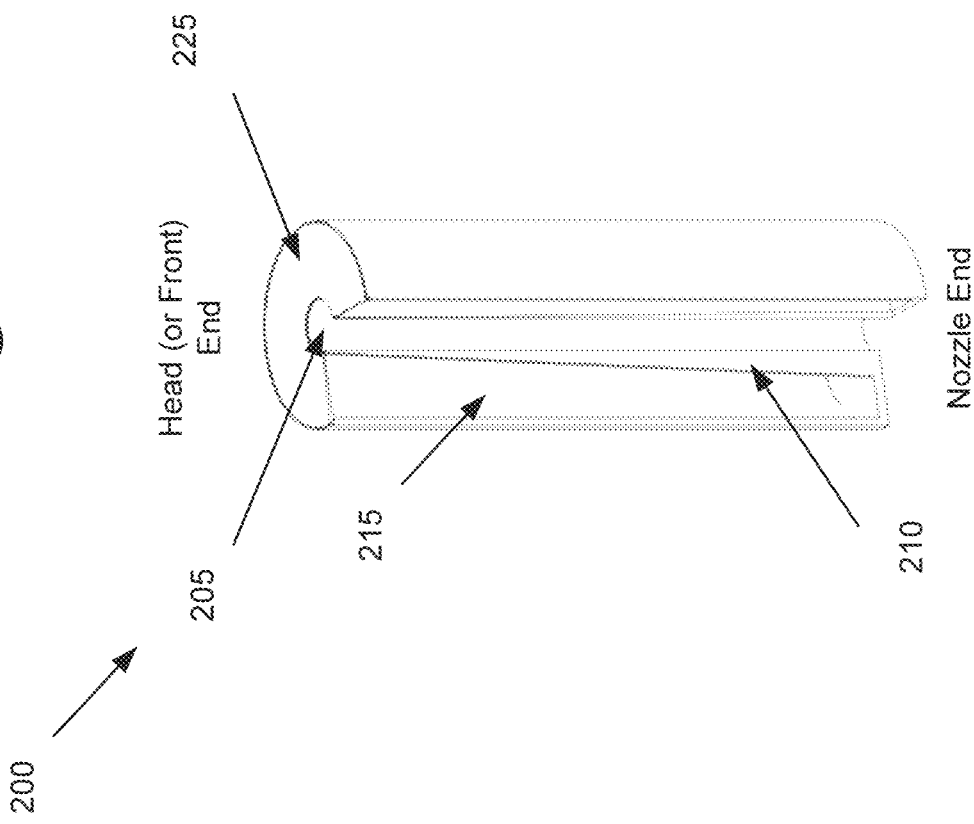

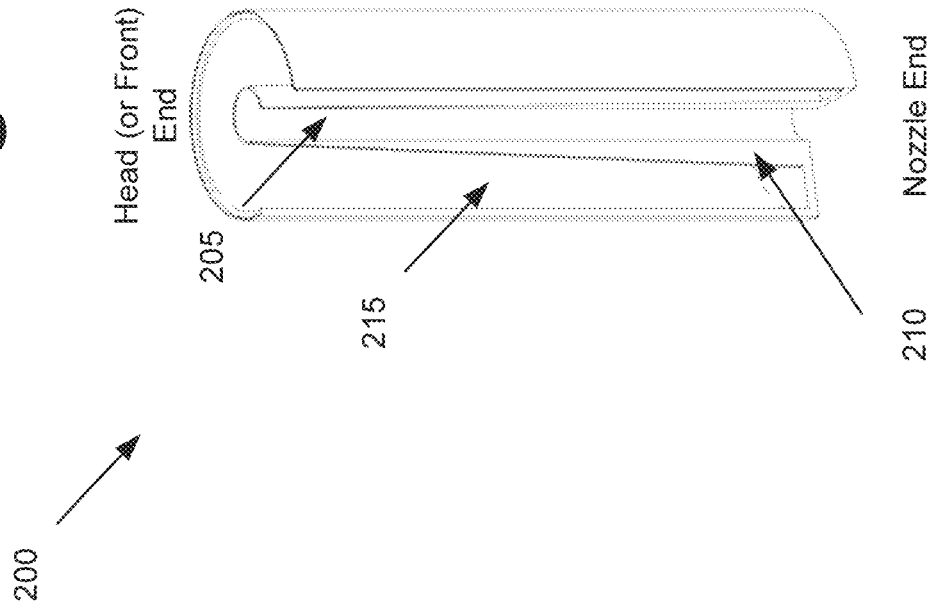

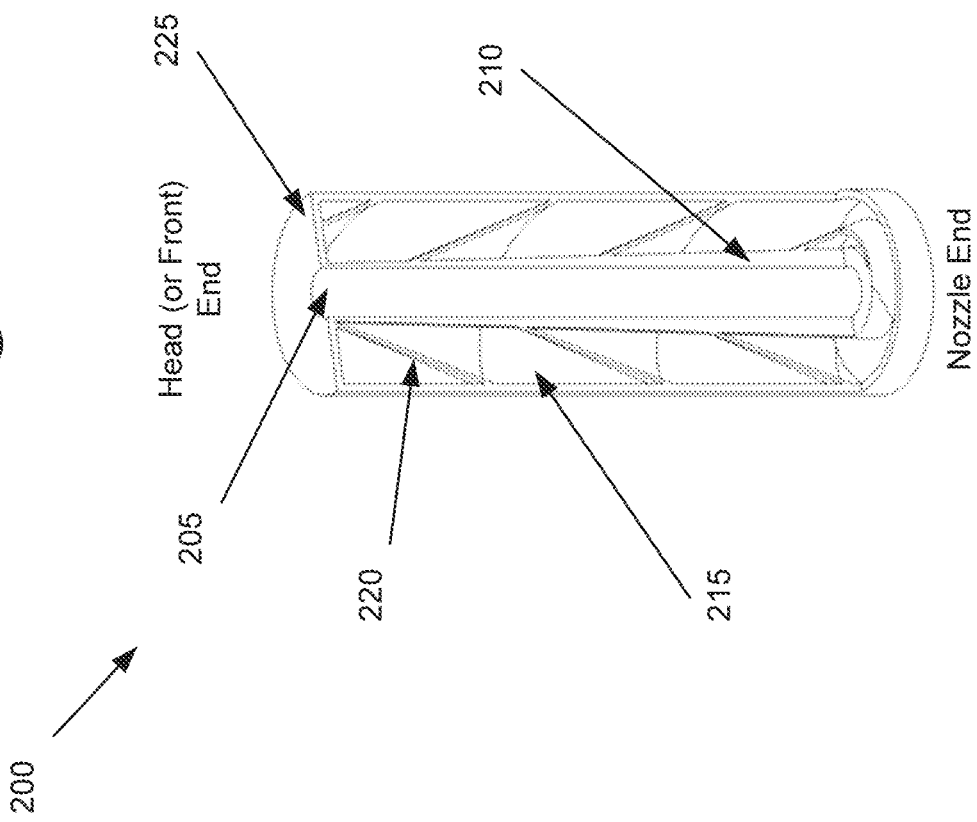

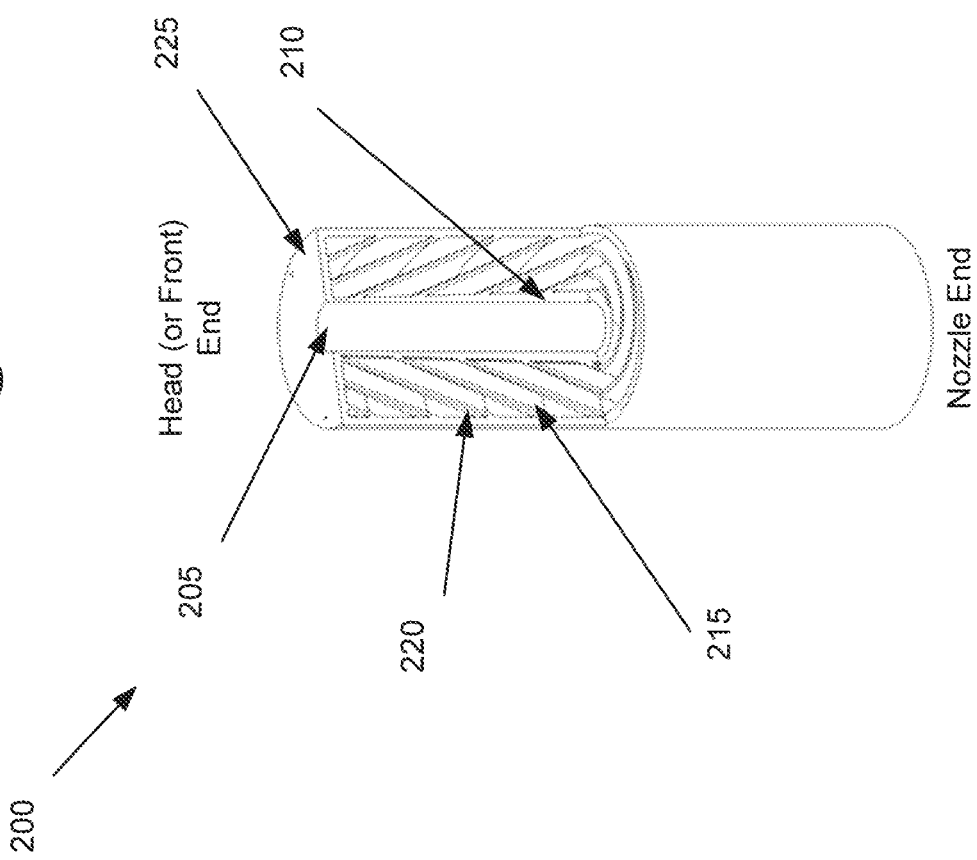

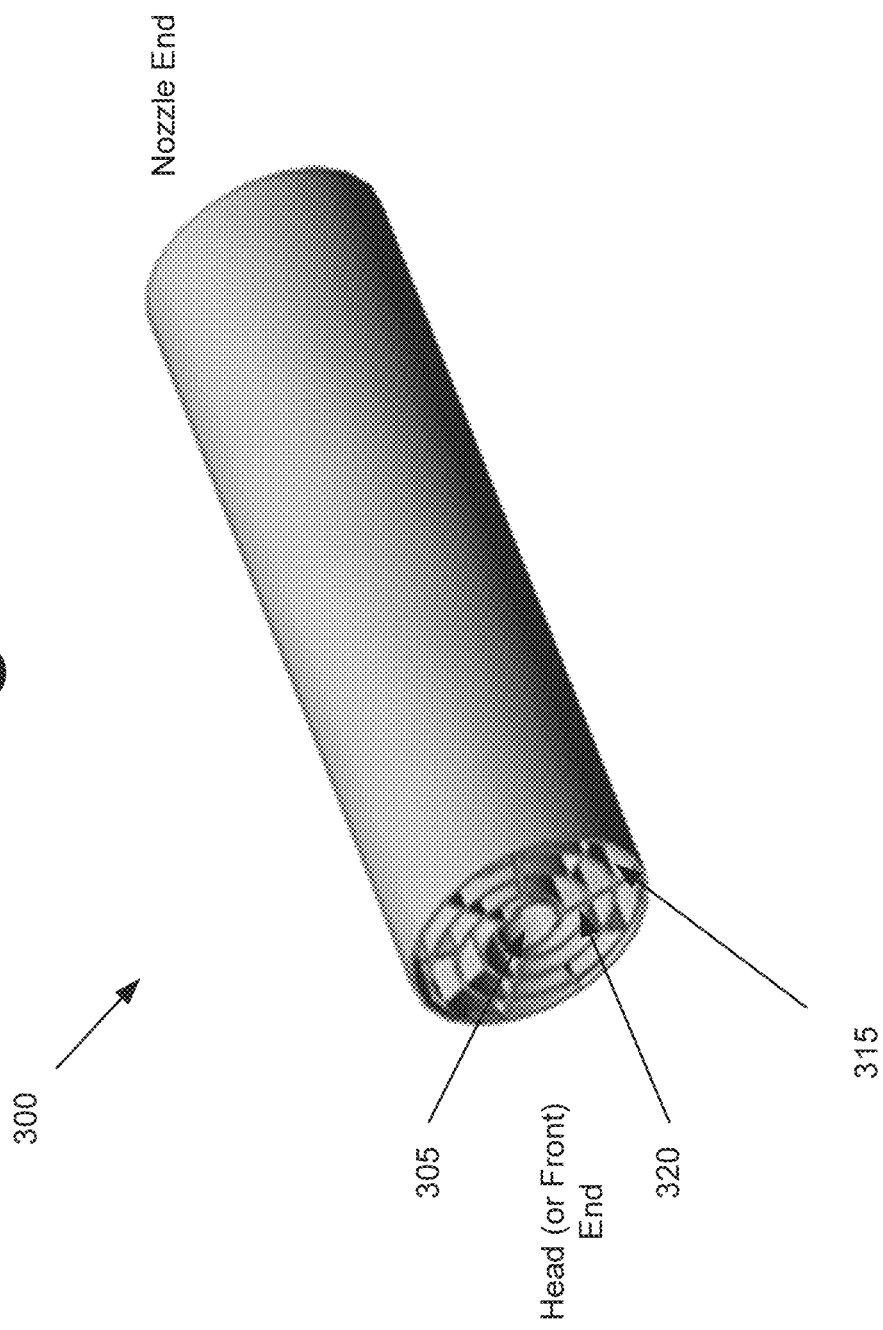

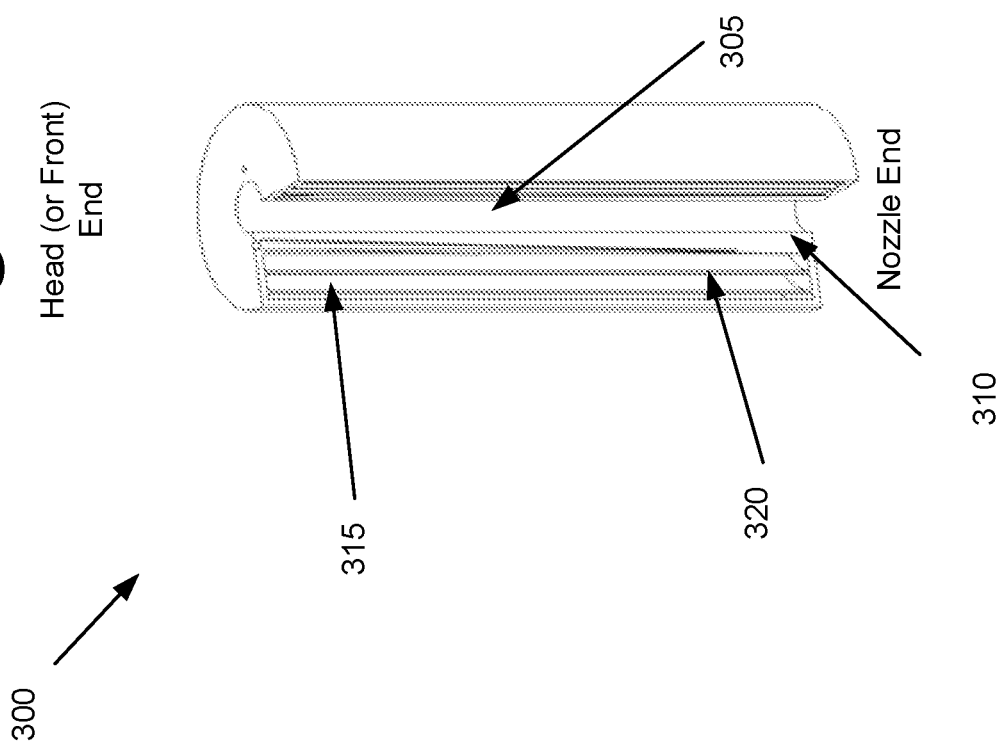

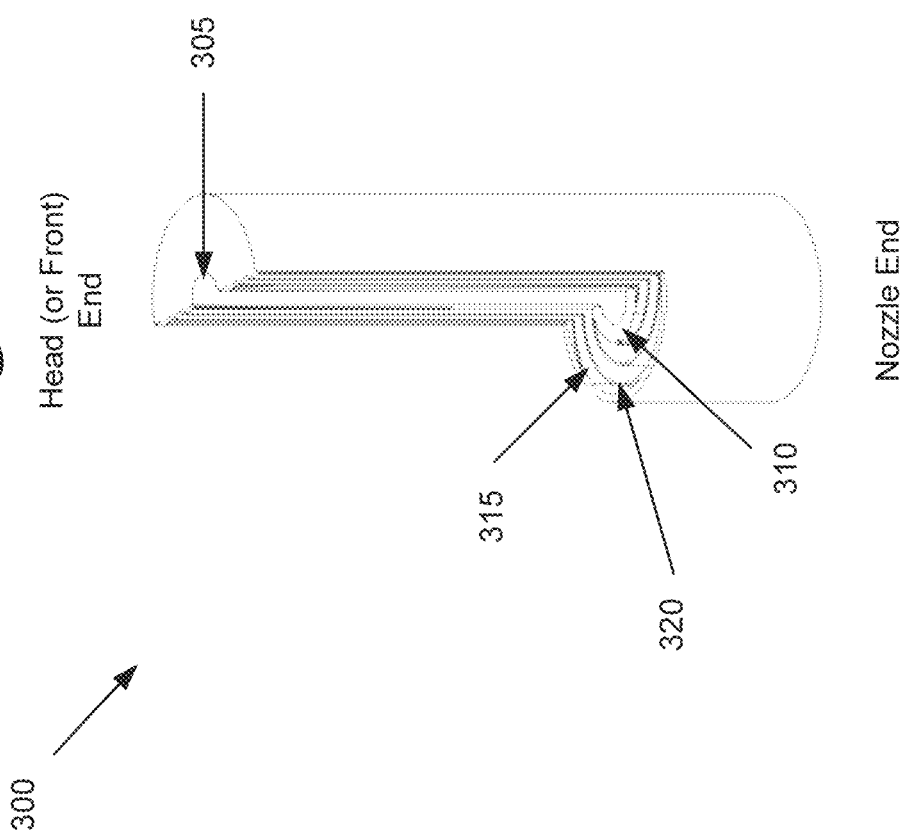

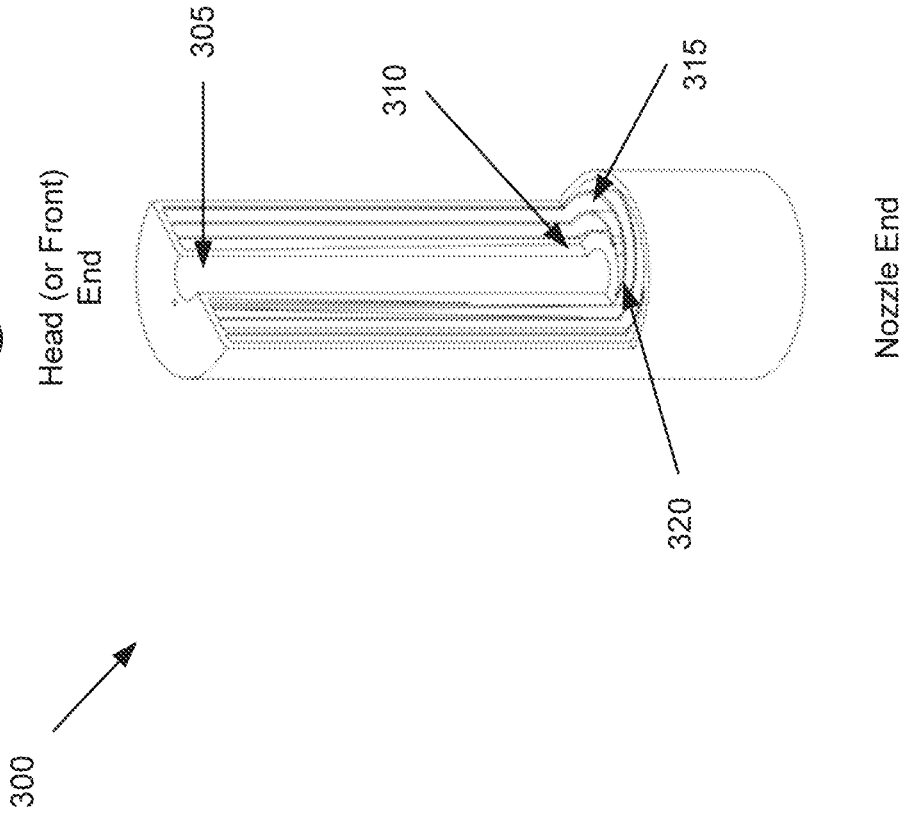

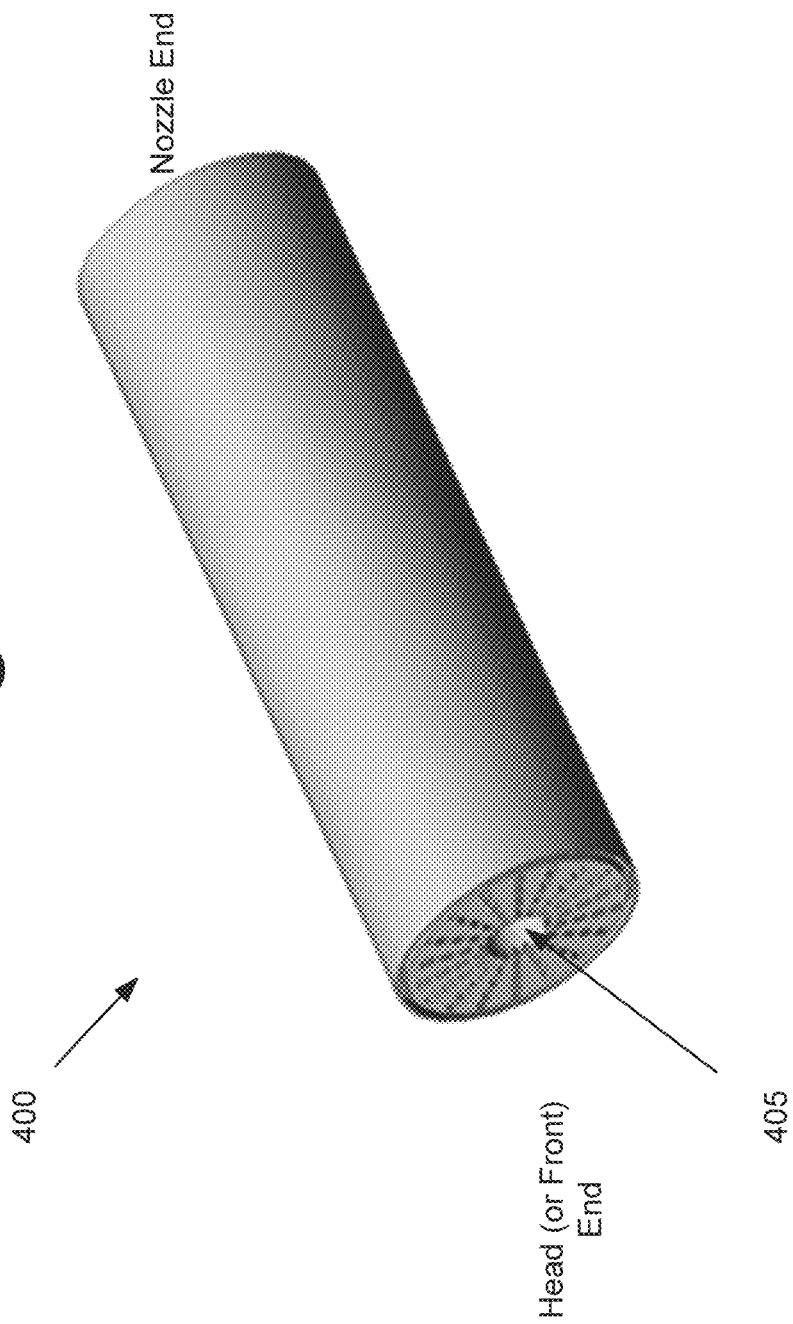

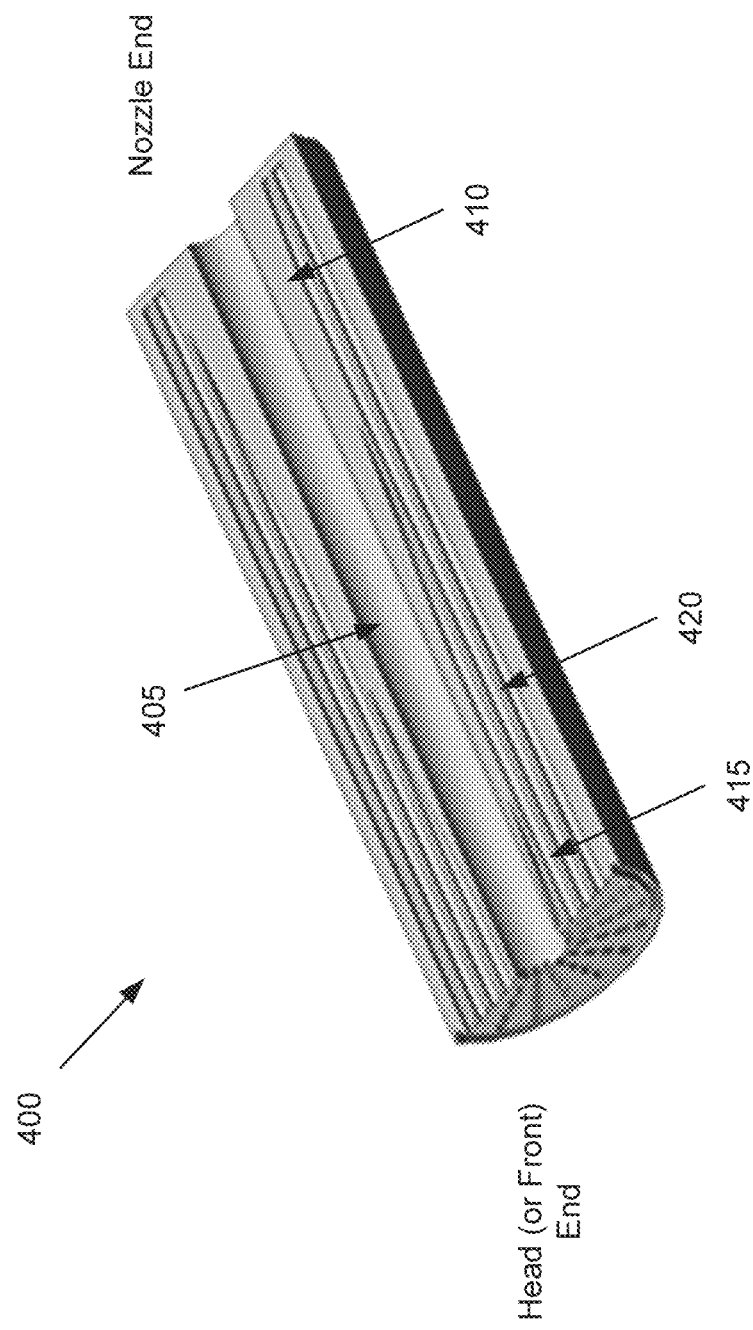

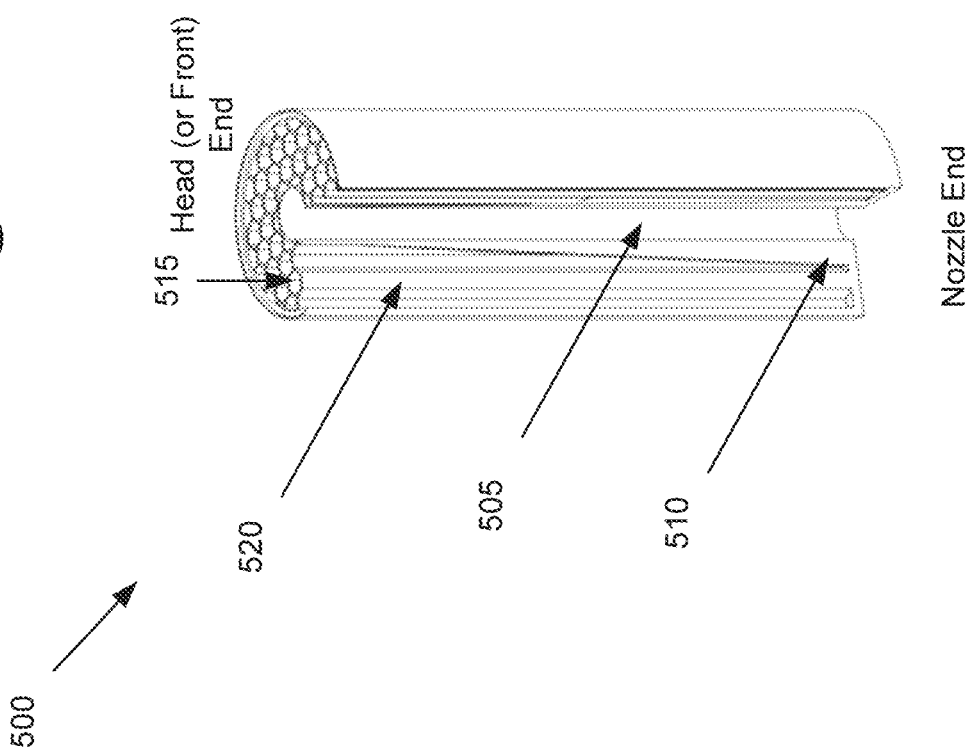

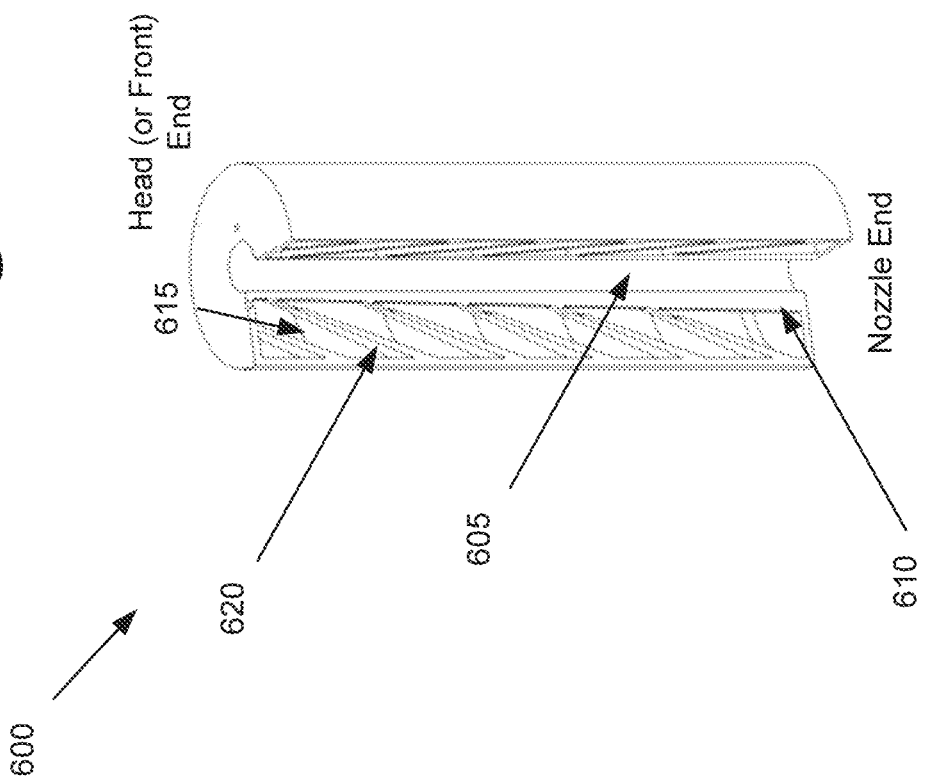

Fig. 13

Table 1. The measured results for the ABS hybrid motor experiments.

| Formulation | Test number | Chamber pressure | Burn time | | Mass motor | | Oxidizer flow rate | Fuel mass loss rate | O/F |
|---|---|---|---|---|---|---|---|---|---|
| | | PSI | initial s | initial + kerosene s | g | final g | g/s | g/s | |
| Design A: ABS | 1 | Not measured | 5.28 | | N/A | 1397.4 | 20.5 | 5.8 | 3.53 |
| Design A: ABS + 5g kerosene | 2 | 81. | 5.16 | 1359.0 | 1959.0 | 1293.4 | 25.3 | 12.7 | 1.99 |
| ABS Blank | 3 | 65.6 | 4.5 | 232 | N/A | 2008.8 | 18.5 | 5.2 | 3.54 |
| Design C: ABS + 6.4 g kerosene | 4 | 63.8 | 4.6 | 273.3 | 2779.7 | 2469.2 | 20.7 | 6.6 | 3.1 |
| Design C: ABS + 30 g kerosene | 5 | 98.1 | 5.03 | 272.4 | 3802.0 | 2432.6 | 19.7 | 11.9 | 1.62 |
| Design B: ABS + 15 g kerosene | 6 | 33.5 | 4.5 | Not measured | 2324.9 | 2392.2 | 18.5 | 7.3 | 2.53 |
| Design C: ABS Blank | 7 | 59.0 | 4.7 | 275.6 | N/A | 2446.8 | 18.9 | 6.1 | 3.1 |

LIQUID FUEL METERING IN A HYBRID ROCKET-LIKE LIQUID ROCKET MOTOR

CROSS REFERENCE TO RELATED APPLICATION

This application claims the benefit of U.S. Provisional Application Ser. No. 62/251,848, filed on Nov. 6, 2015. The subject matter of this earlier filed provisional application is hereby incorporated by reference in its entirety.

STATEMENT OF GOVERNMENT INTEREST

This invention was made with government support under Contract No. FA8802-14-C-0001 awarded by the Department of the Air Force. The government has certain rights in the invention.

FIELD

The present invention relates to liquid fuel metering, and more particularly, to metering the release of liquid fuel into a port of a hybrid rocket motor.

BACKGROUND

In a hybrid rocket motor, propellants of different phase states, such as solid fuel and liquid oxidizer, are combined to produce thrust. FIG. 1 is related art illustrating a traditional hybrid rocket motor 100, according to an embodiment of the present invention. Traditional hybrid rocket motor 100 includes an oxidizer tank 105, which stores oxidizer. With a traditional hybrid rocket motor 100, since the fuel is generally stored as a solid fuel grain 130 in a motor casing 115 and circumferentially around port 135, the solid fuel grain has to be liberated from the surface layer of a port 135 via processes such as evaporation or thermal decomposition. With traditional hybrid rocket motor 100, the solid fuel grain is cast rubber.

When valve 110 is open, oxidizer releases into port 135 via an injector 125, and an igniter 120 is used to begin the ignition process so the oxidizer and solid fuel grains 130 may be mixed.

However, the casting process constrains the possible shapes of the grain to ones that do not have much surface area and do not have features, such as undercuts, that would promote mixing of fuel and oxidizer.

Paraffin fuel has been used to make high regression rate motors, but these motors tend to burn a significant amount of paraffin in the plume, potentially wasting propellant. Recent experiments have shown that elevating the temperature of paraffin, which is stored in cells in printed fuel grains, increases the regression rate of the surface layer beyond that of cast paraffin fuel grains while burning a greater portion of the paraffin fuel inside the rocket motor.

In a typical liquid rocket motor, the fuel is stored in a tank fed into a separate combustion chamber, where it is combined with an oxidizer and burned to produce a thrust. The fuel storage tank must be pressurized and/or be evacuated by a turbo pump.

Thus, it may be beneficial to place all of the liquid fuel in a combustion chamber the same way that the solid fuel is stored in a hybrid rocket motor, as shown in FIG. 1. The motor would then have oxidizer flow through it in a manner similar to the flow of oxidizer in a hybrid grain. In such a setup, an approach to meter the release of liquid fuel in the main flow of oxidizer is needed to prevent liquid fuel from flooding the combustion chamber. Thus, metering the flow of liquid fuel into a port of the hybrid rocket motor would be both beneficial and critical to successful implementation.

SUMMARY

Certain embodiments of the present invention may provide solutions to the problems and needs in the art that have not yet been fully identified, appreciated, or solved by current rocket motors. For example, some embodiments may pertain to metering the release of liquid fuel into a port of the hybrid rocket motor. In some embodiments, a fuel grain may be created, where liquid fuel can be stored. The liquid fuel may then be liberated in a controlled matter to allow a construction of a powerful liquid hybrid rocket motor. In other embodiments, a mechanism to connect the port to the outer wall, top, and bottom surfaces may encourage mixing as the motor burns.

In an embodiment, an apparatus for metering flow of a liquid propellant. The apparatus may include a motor comprising a port and a chamber surrounding the port. A wall may separate the port and chamber, and may be made of plastic material configured to burn away. This may allow liquid fuel stored within the chamber to be metered into the port as the wall burns away.

In another embodiment, a hybrid liquid rocket motor may include a solid fuel grain having a central port, allowing oxidizer to flow through the central port of the solid fuel grain. Upon ignition of the solid fuel grain, a surface surrounding the central port begins to regress, exposing the one or more chambers, which include liquid fuel. The regression of the surface meters the flow of the liquid fuel into the central port, thereby mixing the liquid fuel with the oxidizer to produce a combustion.

In yet a further embodiment, a hybrid liquid rocket motor may include a solid fuel gram that includes a central port with a tapered wall to prevent the tapered wall from quickly regressing during ignition of the motor. The hybrid liquid rocket motor may also include a chamber that includes liquid fuel surrounding the central port. The liquid fuel is metered into the central port, mixing with oxidizer to produce a combustion, as the tapered wall is regressing during the ignition of the motor.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is related art illustrating a traditional hybrid rocket motor, according to an embodiment of the present invention.

FIG. 2A is a schematic diagram illustrating a hybrid liquid type motor (hereafter referred to as "motor"), according to an embodiment of the present invention.

FIG. 2B is a cross-sectional diagram illustrating the motor of FIG. 2A with a lid, according to an embodiment of the present invention.

FIG. 2C is a cross-sectional diagram illustrating the motor of FIG. 2A without a lid, according to an embodiment of the present invention.

FIG. 2D is a cross-sectional diagram illustrating the motor of FIG. 2A with conical helix chambers, according to an embodiment of the present invention.

FIG. 2E is a cross-sectional diagram illustrating the motor of FIG. 2A having a 3-start conical helix chambers, according to an embodiment of the present invention.

FIG. 3A is a schematic diagram illustrating a motor, according to an embodiment of the present invention.

FIGS. 3B-3D are cross-sectional diagrams illustrating the motor of FIG. 3A, according to an embodiment of the present invention.

FIG. 4A is a schematic diagram illustrating a motor, according to an embodiment of the present invention.

FIG. 4B is a cross-sectional diagram illustrating the motor of FIG. 4A, according to an embodiment of the present invention.

FIG. 5 is a schematic diagram illustrating a motor, according to an embodiment of the present invention.

FIG. 6 a schematic diagram illustrating a motor, according to an embodiment of the present invention.

FIG. 13 is a table illustrating measured parameters for all of the tests, according to an embodiment of the present invention.

DETAILED DESCRIPTION OF THE EMBODIMENTS

Figure 7:
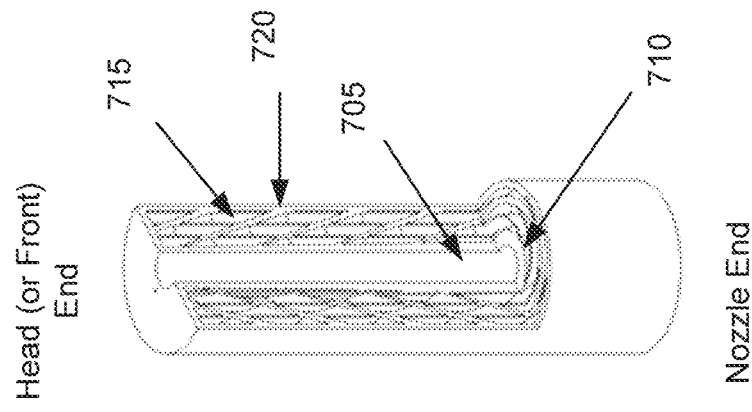
FIG. 7 is a schematic diagram illustrating a motor, according to an embodiment of the present invention.

Embodiments of the present invention pertain to a hybrid liquid type rocket motor (or "motor") that includes solid fuel grains with voids filled with liquid fuel. The release of the liquid fuel may be metered in some embodiments. For example, the flow of the liquid fuel may be released in a controlled manner into a port of the hybrid liquid type rocket.

Various embodiments of the hybrid liquid type rocket motor may be used to prevent large volumes of liquid fuel from being quickly released into the port. For example, FIG. 2A is a schematic diagram illustrating a motor 200, according to an embodiment of the present invention.

In some embodiments, motor 200 may be composed of Acrylonitrile Butadiene Styrene (ABS) thermoplastic. ABS is commonly available, and often used, in injection molding and 3-Dimensional (3D) printing. The bulk material has been shown to be similar in performance to a traditional hydroxyl-terminated polybutadiene (HTPB) hybrid rocket fuel. Also, where HTPB is a crosslinked material, similar to the rubber used in automotive tires, waste propellant cannot be conveniently recycled. Since ABS is thermoplastic, scrap material is simply re-melted and reused. Other usable materials may include acrylic, polycarbonate, polyamide, thermoplastic elastomer, hydrocarbons such as polypropylene, polyethylene and paraffin wax, and photopolymers, such as those used in Stereolithography.

While motor 200 may be a 3D printed motor in some embodiments, motor 200 may be assembled in any manner that would be appreciated by a person of ordinary skill in the art. For example, other production techniques may include injection molding, blow molding, rotomolding, rotational molding, spin casting, or casting. With these production techniques, the assembly may use composite materials such as polymer, carbon fiber cloth, aramid fiber cloth, fiberglass cloth, or aramid fiber paper. The assembly may be joined using fasteners, thermoplastic welding, chemical welding, friction welding, ultrasonic welding, or fitting components together using design features such as tongue-in-groove.

As shown in FIGS. 2A-2E, motor 200 may include a port 205 and, in some embodiments, a lid 225. Although FIGS. 2A-2E show a single port 205, multiple ports may be utilized in other embodiments. For example, multiple ports in parallel to one another may allow increase in thrust. Since hybrid grain ports generally burn outward radially, keeping a constant radial wall thickness may result in large slugs of fuel being quickly flushed and prevent the fuel from being burned efficiently. To prevent these inefficiencies, the thickness of wall (port wall) 210 of port 205 may be increased from head end to nozzle end of the fuel grain. See, for example, FIGS. 2B-2E.

Surrounding wall (or surface) 210 is chamber 215. See, for example, FIGS. 2B and 2C. As wall 210 burns during operation of motor 200, liquid fuel from chamber 215 may enter port 205, and mix with the gas or oxidizer within port 205. The mixing of the liquid fuel with the gas may create combustion or thrust.

In some embodiments, motor 200 may also include a plurality of longitudinally stacked conical helix shaped chambers 215, each separated by a segmented wall 220. See, for example, FIG. 2D. Liquid fuel, such as kerosene in some embodiments, may be filled into chambers 215. During operation, to prevent liquid fuel from being pushed towards one side of motor 200, i.e., in the direction of gravity, chambers 215, which are separated by segmented walls 220, act as a barrier to slosh.

In some embodiments, wall 210, and in some embodiments, segmented wall 220, may be printed with a material that, together with the appropriate oxidizer, would form a hypergolic combination. Such combinations may include lithium-aluminum hydride and hydrogen peroxide. The hypergolic fuel portion may be confined to specific regions of a grain structure or be distributed throughout the grain structure.

In some embodiments, chambers 220 may include liquid fuel that would be hypergolic with the chosen oxidizer. For example, triethylaluminum and triethylborane may be liquid hypergolics. In some embodiments, hydrazine or monomethyl hydrazine may be stored for use with dinitrogen tetroxide.

In some embodiments, as gravity pulls from head end to nozzle end, chambers 215 may hold the liquid fuel in place. This may hold true even as wall 210 of port 205 begins to burn away from head end to nozzle end. As wall 210 of port 205 begins to burn away, liquid fuel from chamber 215, which is closest to head end, may begin to mix with gas flowing in port 205. At the same time, in some embodiments, segmented walls 220 between chambers 215 may also begin to burn away or disintegrate, allowing liquid from a subsequent chamber 215 to mix with the gas in port 205.

In a traditional hybrid, the wall material of the combustion chamber is made of a flammable hydrocarbon material such as rubber or polymer. This material is typically called the fuel grain or motor grain. The fuel grain has a central port (or multiple ports) that allow for oxidizer to flow through the fuel grain. When the fuel grain is ignited, the material that composes the fuel grain surface regresses in distance (i.e., the central port opens up), as the motor burns during operation of the hybrid rocket. This occurs because the heat released from the burning process liberates more material from the surface of the fuel grain. This liberated hydrocarbon fuel from the fuel grain surface then combusts with the oxidizer flow. In the embodiments described herein, this process of the fuel grain surface regressing would open up one or more voids (or one or more chambers) filled with liquid fuel (or liquid material). This liquid fuel may then be entrained in the flow similar to the liberated fuel grain in a traditional all solid hybrid motor. Unlike traditional fuel grains, the liquid fuel has the desirable feature of not having to undergo the heat of fusion in order to become entrained in the main gas flow. The liquid fuel may have additional features such as a hypergolic nature. In addition, the liquid fuel is more readily able to form droplets and waves, which have been shown to enhance hybrid performance. The voids or chambers storing the liquid fuel can be gross features as those described here or produced as discretely as possible to tailor performance of the desired need of the motor.

In some embodiments, such as that shown in FIG. 2E, a three (3) start conical helix shaped chamber 215 may surround wall 210, and separated by segmented walls 220. A conical helix, as shown in FIG. 2E may eliminate combustion instability by allowing liquid fuel to be subducted into port 205 in a continuous manner as motor 200 burns radially outward and as the top burning surface regresses toward the nozzle.

FIG. 3A is a schematic diagram illustrating a motor 300, according to an embodiment of the present invention. In some embodiments, motor 300 may include a port 305 surrounded by a wall 305. Wall 305 in some embodiments may be tapered to prevent inefficient mixing of the liquid fuel with the gas.

As shown in FIGS. 3A-3D, also surrounding port 305 are a plurality of spiraled chambers 315 separated by segmented walls 320. Each spiraled chamber 315 in some embodiments is filled with liquid fuel. By placing segmented walls 320 between each spiraled chamber 315, the mixing of the liquid fuel with the gas may be metered. For example, as tapered wall 205 begins to burn away from head end to nozzle end, the liquid fuel from the first spiraled chamber 315 may mix with the gas flowing through the port. As the segmented wall between spiral chambers 315 begins to burn away, the liquid fuel from the next spiral chamber 315 begins mix with the gas in a controlled manner. This process will continue until tapered wall 305 and/or each segmented wall 320 burns away.

FIG. 4A is a schematic diagram illustrating a motor 400, according to an embodiment of the present invention. In some embodiments, motor 400 may include a port 405 surrounded by a tapered wall 410. Surrounding tapered wall 410 are a plurality of chambers 415 separated by segmented walls 420. See also FIG. 4B. Each chamber 415 holds liquid fuel in some embodiments. While the general operation of motor 400 may be the same as motors of FIGS. 2A-3D, the liquid fuel in some embodiments may be used to accelerate or enhance the burning of the solid fuel. For example, as liquid fuels are liberated from their chambers (or cells), the liquid fuels expose an additional surface area of the cell walls for burning. At the same time, the liquid fuels may liberate additional energy, since the liquid fuels often have higher heats of combustion than polymer solids. Kerosene, for example, may have a higher heat of combustion than the fuel grain material that might store it. Since the liquid fuel may be more quickly dispersed into the port than a solid, which would first have to be pyrolized, more heat is liberated more quickly. This, in turn may cause the solid fuel to burn more quickly.

FIG. 5 is a schematic diagram illustrating a motor 500, according to an embodiment of the present invention. In some embodiments, motor 500 may include a port 505 and a tapered wall 510 similar to the embodiments of FIGS. 2A-4B. Motor 500 may further include honeycomb shaped chambers 515 surrounding port 505 and tapered wall 510. Honeycomb shaped chambers 515 are separated by separating walls 520. In some embodiments, honeycomb shaped chambers 515 may allow in situ printing of liquid cells within the fuel grain. Similar cells composed of acrylic material filled with high regression rate paraffin wax motors have shown better performance than cast paraffin motors. These honeycombs may potentially be filled with liquid instead of the previous demonstrated solid paraffin wax. The liquid could be printed in situ either by injecting liquid during the print process, or using a solid fill material, such a heptadecane, that would melt around room temperature. This material should in certain embodiments print similar to paraffin wax, yet be melted in place at room temperature and thus perform similar to kerosene. The release of heterogeneous liquid mixtures may be metered as well by the described metering approach. Since the individual honeycomb shaped chambers 515 allow for heterogeneous printing of solid support structure and liquids, the liquid itself is not limited to one material. Individual cells or chambers may potentially be filled with different liquids that allow tailoring of the motor performance. This material may include hypergolic liquids, low vapor pressure hydrocarbons, gels, and colloidal mixtures.

FIG. 6 is a schematic diagram illustrating a motor 600, according to an embodiment of the present invention. Motor 600 may include a port 605 with a tapered wall 610. Motor may further include a plurality of stacked cone shaped chambers (or "chambers") 615 with segmented walls 620 separating each chamber 615.

FIG. 7 is a schematic diagram illustrating a motor 700, according to an embodiment of the present invention. Motor 700 may include a port 705 with a tapered wall 710. Motor may further include a plurality of stacked cone shaped chambers (or "chambers") 715 with segmented walls 720 separating each chamber 715. In some embodiments, chambers 715 in combination of walls 720 are constructed in a spiral manner.

It should be appreciated that the motors described herein may force hot combustion gases against the wall of the port. This force convection of hot gases may vaporize the liquid fuel within the chambers quickly and efficiently. Also, one or more of these embodiments may allow the liquid fuel and oxidizer to mix in a more efficient manner. Because the liquid fuel is compartmentalized in the motor, combustion instability may be alleviated. In tests, for example, combustion surges were observed in some designs. It is believed that the combustion surges are related to the motor burning-through barriers (e.g., the segmented walls) and releasing liquid fuel in an uncontrolled manner. The stacked cone arrangement may suffer from this in some embodiments. For example, a conical helix, as shown in FIG. 2E, may eliminate this cause of combustion instability by allowing liquid fuel to be subducted into port 205 in a continuous manner as the port burns open.

It should also be appreciated that the motors shown and described herein may be manufactured using 3D printing or any manufacturing technique that would be appreciated by one of ordinary skill in the art.

The most common method for analysis of performance of a hybrid rocket motor is to use spatial and temporal averaging procedures based on measuring thickness of the fuel grain over time (TOT). For this technique, the average regression rate may be determined as the final port radius $r_f$ subtracted by the initial port radius $r_i$, and then divided by the burn duration. See Equation (1)

$$\bar{r} \cong \frac{r_f - r_i}{t_b} \quad (1)$$

The burn duration is obtained from the post-combustion chamber pressure-time trace showing ignition and then the flame being extinguished by the nitrogen purge. For motors with simple geometries, such as a single central port, this method may be easier to implement. However, the motor configuration described herein are geometrically complex, especially after the initial round center port burns out and exposes the inner chambers, for example. Thus, the active burning surface cannot be easily defined by Equation 1.

There are complex procedures that can be used to estimate regression rate for complex port designs that use a time resolved CAD program to estimate final geometric state of the complex flow paths based on regression over the total complex surfaces. This method assumes solid fill material and is involved in the regression, and thus, the method might not lend itself to a solid motor with liquid fills, where the liquid flows and is readily entrained in the oxidizer flow once it is exposed. This makes the surface regression rate an unreliable number for evaluation of the current work.

Instead, the current evaluation may utilize the traditional TOT method for mass. The mass of the fuel grain is measured before and after burning to calculate average motor performance. This may be accurate provided that the liquid fuel, such as kerosene, is consumed in the test. A video was used to monitor the combustion of the kerosene to ensure all of the kerosene was being consumed in the combustion process, and was not leaking out of the motor. This process was repeated for motor grains with and without kerosene to understand the change in mass loss due to the added combustion of kerosene. The average fuel mass loss rate can be readily calculated by measuring the mass of the test motor before and after motor firing. The mass-loss rate is given by:

$$\bar{\dot{m}} \cong \frac{m_f - m_i}{t_b} \quad (2)$$

Typically, the average mass loss is plotted as a function of the average oxidizer mass flux $\bar{G}_{ox}$. The average oxidizer mass flux $\bar{G}_{ox}$ is obtained by using the oxidizer mass flow rate divided by the average port area during the burn.

$$\bar{G}_{ox} \cong \frac{2\dot{m}_{ox}}{\pi(r_f + r_i)^2} \quad (3)$$

Given that the initial and final radius are not well defined, the total mass flux may be hard to determine in these experiments. The total mass of fuel compared to the mass of the oxidizer used may be used instead of comparing motor performance. The O/F ratio is defined as:

$$\frac{O}{F} = \frac{\dot{m}_{ox}}{\dot{m}_{fuel}} \quad (4)$$

Figure 8:
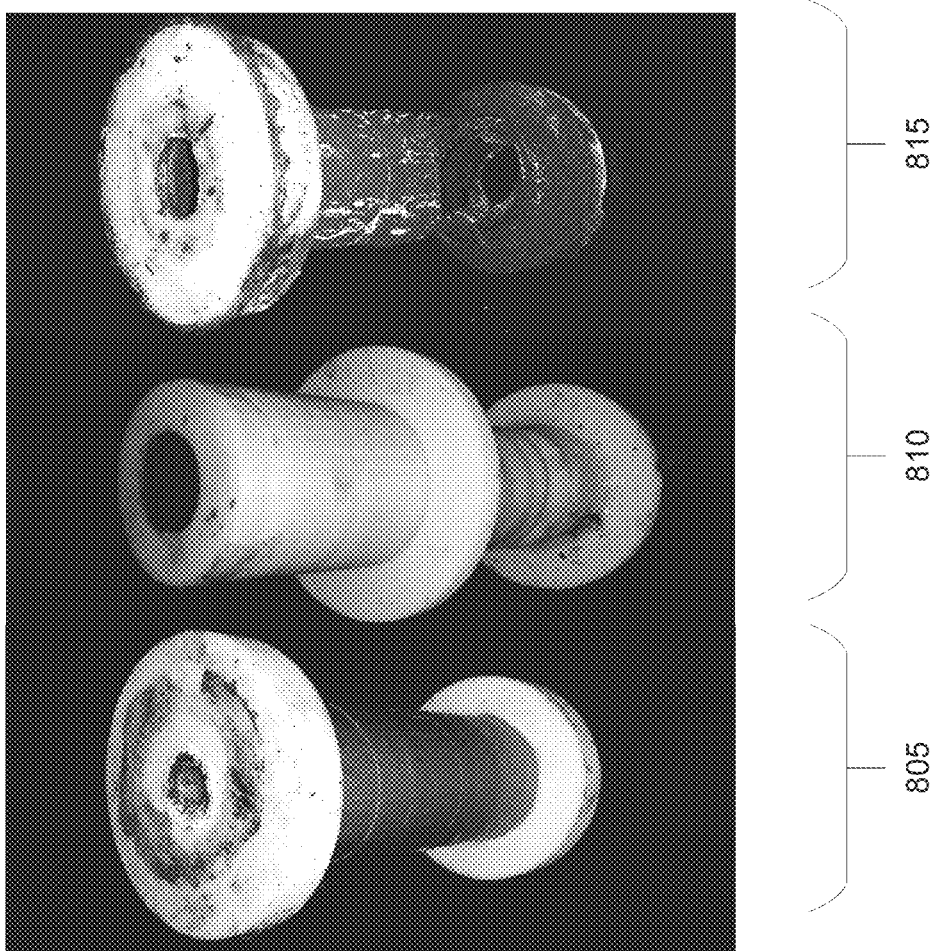
FIG. 8 illustrates a plurality of motors pre and post combustion, according to an embodiment of the present invention.

FIG. 8 illustrates a plurality of motors 800 pre- and post-combustion, according to an embodiment of the present invention. In FIG. 8, the plurality of motors includes unburnt motor 805, ABS only motor 810 after a 5 second burn, and an ABS motor 815 with kerosene after a 5 second burn. In this example, ABS only motor 810 without kerosene (or liquid fuel) burned away the central port exposing the interior structure. The outer wall did not burn through, although, the thermoplastic was clearly warped. ABS motor 815 with kerosene, however, burned through both the inner port and the outer wall exposing the stainless steel container to the burn. This isn't problematic, but demonstrates a difference from the initial baseline test.

Figure 9:
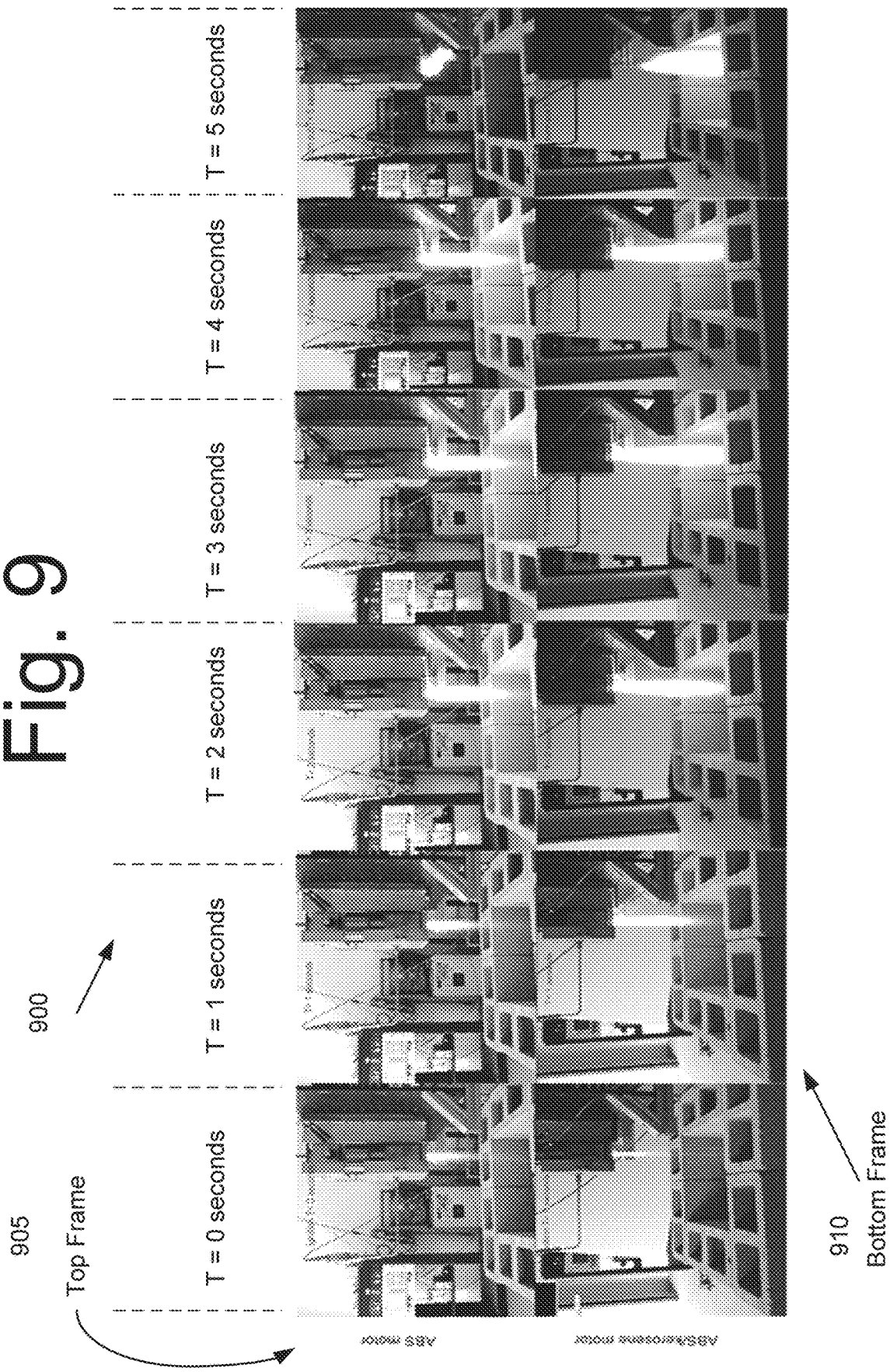
FIG. 9 illustrates a series of frames from a motor test, according to an embodiment of the present invention.

FIG. 9 illustrates a series of frames 900 from a motor test, according to an embodiment of the present invention. Top frames 905 show the ABS motor test burn without kerosene, and bottom frames 910 show the ABS motor having 5 g of kerosene.

In this example, the first frame of top frame 905 and bottom frame 910 shows that both motor burns are similar, as the ignition of both motors showed a small amount of sparking due to the igniter detonation. The next frame at the 1 second mark of top frame 905 and bottom frame 910 shows that the motor burns are similar, indicating that ABS material is only burning. The third frame at the 2 second mark starts to show a noticeable difference between the two motors. For example, in bottom frame 905, the central ABS port has burned through at this point in the burn, and the kerosene in the motor is now being exposed to the main gas flow. The flame emerging from the nozzle is much longer for the kerosene containing motor, and the flame is more intensely yellow, which may indicate an influx in unburned hydrocarbon soot.

Returning back to FIG. 8, the post burn photograph of ABS motor 815 with 5 g of kerosene, for example, appears to have more of an external soot than the ABS only motor 810. Although, this may be partially due to the burn that the motor experienced. The introduction of a longer flame in ABS motor 815 with 5 g of kerosene may indicate a shift in the O/F of the motor due to the addition of kerosene to the main gas flow.

Referring to FIG. 9, the final frame in top frame 905 and bottom frame 910 shows engine shutoff. There is once again a noticeable difference between the two motors during engine shutoff. For example, the pure ABS motor in top frame 905 shows flame attachment and the flame retreats into the nozzle during shutoff. The ABS motor with 5 g of kerosene in bottom frame 910 shows flame detachment from the nozzle, which may indicate burning of a hydrocarbon material, likely kerosene vapors. Both engines shut off within a fraction of a second after oxygen flow was shutoff. No liquid fuel was observed seeping out of the motor post-test.

Figure 10:
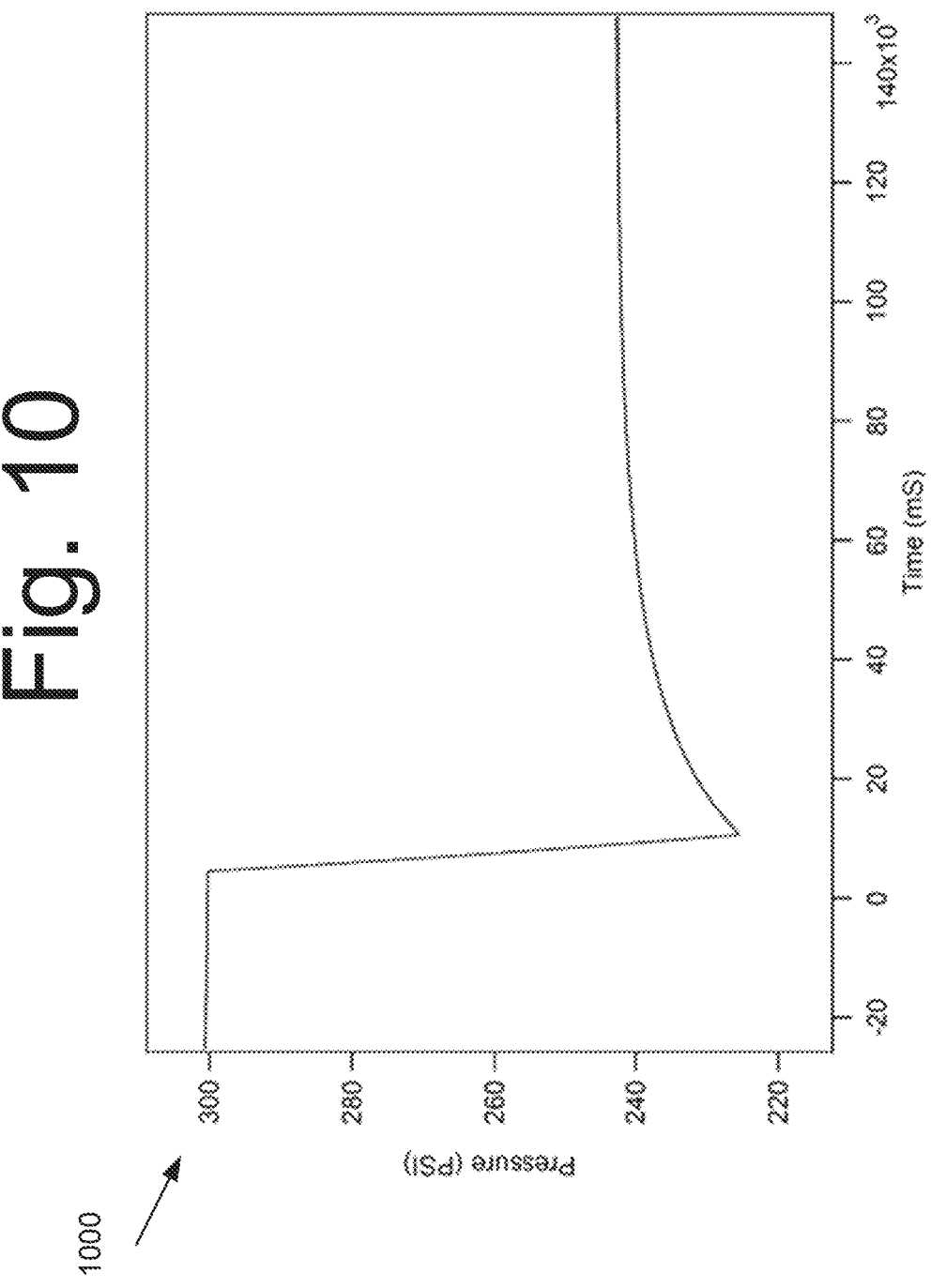
FIG. 10 is graph illustrating a pressure inside an oxygen reservoir during a test, according to an embodiment of the present invention.

FIG. 10 is graph 1000 illustrating a pressure inside an oxygen reservoir during a test, according to an embodiment of the present invention. The initial and final pressure in the oxygen tank allows a determination of the oxygen mass used during the burn. The final pressure is recorded for a few minutes after burn completion to allow the reservoir $O_2$ tank to reach a steady state pressure reading again.

Figure 11:
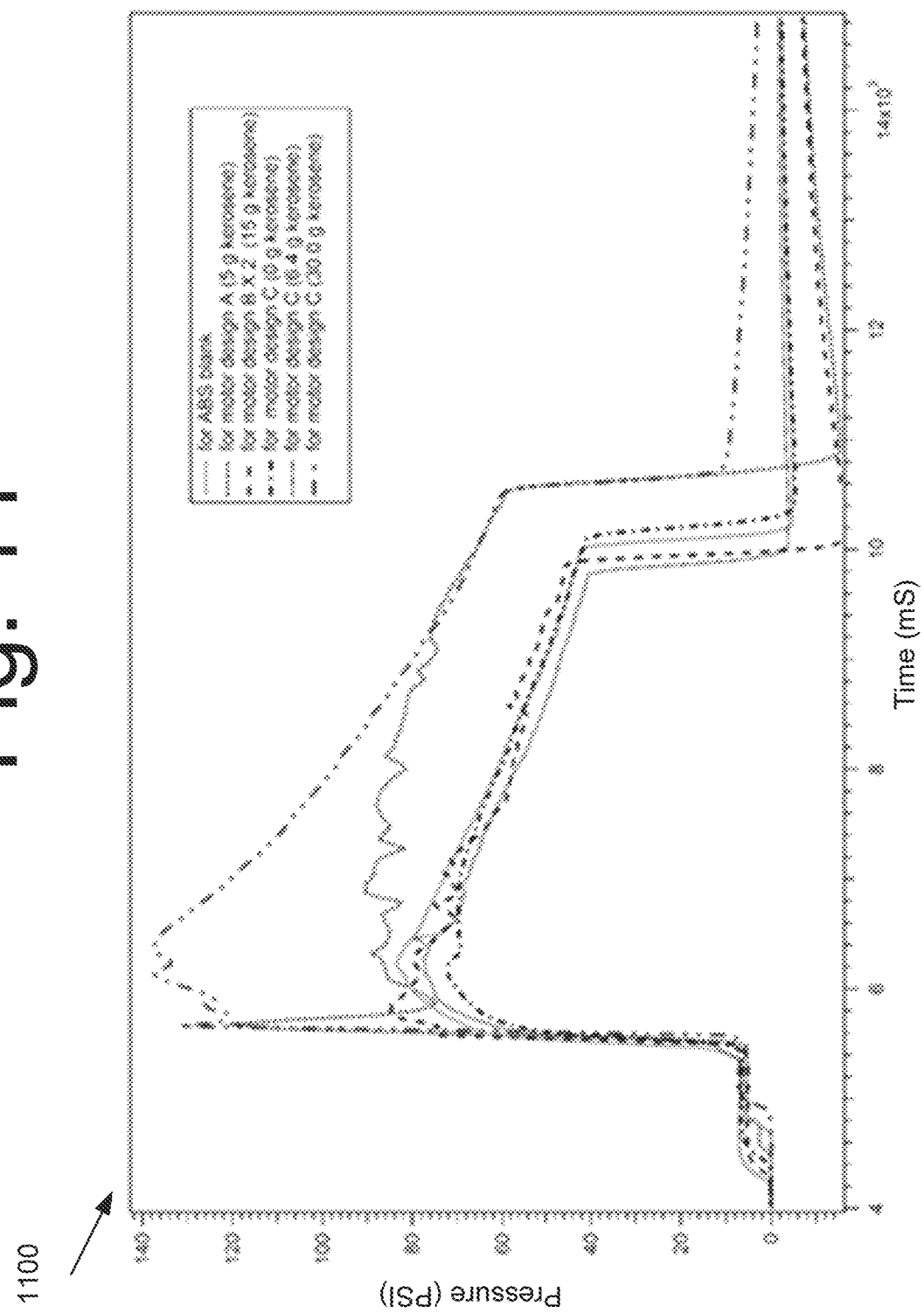
FIG. 11 is a graph illustrating a measured pressure inside a post combustion chamber during the burn for a series of ABS motors, according to an embodiment of the present invention.

FIG. 11 is a graph 1100 illustrating a measured pressure inside a post combustion chamber during the burn for a series of ABS motors, according to an embodiment of the present invention. As shown in FIG. 11, the pressure remains low in the post combustion chamber until the reservoir oxygen valve is opened. The pressure then slightly rises for approximately half a second until the igniter is activated. The pressure inside the post combustion chamber is shown to increase dramatically after ignition of the hybrid motor fuel grain. The time of this rise marks the start of the burn. The time of the full burn is then recorded as the time width of this elevated pressure due to ignition of the motor. The chamber pressure is seen to drop off once the main oxidizer flow is cut off. On some burns, a slight negative off set is observed after shut off that persists until pressure and temperatures return to ambient conditions. Occasionally, the pressure remains elevated after engine shut off due to nitrogen $N_2$ purge gas flow.

A fourth design was tested (Test 4). This design included a printed ABS solid grain motor to use as a blank test. During the blank test, the pressure inside the post combustion chamber drops off significantly throughout the burn as the single ports diameter expands creating a larger and larger volume inside the test motor. In addition to lowering chamber pressure, the phenolic nozzle slowly eroded throughout the burn. This may cause an additional drop in the chamber pressure as well.

For the kerosene burns, the average post combustion chamber pressure was observed to be noticeably higher for Tests 2 and Test 5 compared to the ABS blank or the motors burned without kerosene. As shown in FIG. 1100, the motor used in Test 4 has a continuous drop off in chamber pressure similar to what is typically observed for a solid grain single port hybrid motor. See, for example, Test 3 in FIG. 1100. The similarity of the post combustion chamber in Test 4 to a post combustion chamber in Test 3 having a solid ABS motor indicates that more kerosene in the front channels may be needed.

In this example, the motor in Test 4 included a motor similar to that shown in FIGS. 4A and 4B. The motor in Test 4 also included multiple channels of kerosene so total amount of kerosene in the inner most channel is critical. The motor was initially burned with 6.4 g of kerosene. This amount of kerosene should be sufficient to run fuel rich. However, since the channels should better control kerosene release into the gas flow than Test 2, the motor in Test 4 should not run nearly as rich as the motor in Test 2. There also appears to be slight shift in O/F, but not as dramatic as in Test 2.

Figure 12:
FIG. 12 illustrates a hybrid motor of FIGS. 3A and 3B post-test, according to an embodiment of the present invention.

The post combustion chamber pressure was also on average and not as high. Since this was the initial burn of this motor design, the kerosene level was kept far lower than the full capacity of the channels. Since the motor did not completely burn out to reach the out channels of kerosene, most of the kerosene was simply a spectator mass. See Test 4 of FIG. 11. FIG. 12, for example, shows a post-test photograph of Test 4. This photograph shows that the first two rows of channels with kerosene were exposed. However, the outer chambers were not exposed, and it is unclear how much kerosene mass was released into the flow.

Returning back to FIG. 11, the motor of Test 5 was the same motor design as Test 4, i.e., the motor shown in FIGS. 4A and 4B. However, the motor of Test 5 includes more kerosene to ensure that the inner channels were filled with kerosene. The motor of Test 5 had a hard start due to slight leaking of kerosene through the ABS plastic. The chamber pressure of the motor of Test 5 was similar to chamber pressure of the motor in Test 2. The O/F was also similar to Test 2. This may indicate that Test 4 was limited due to the lack of kerosene in the inner channels of the motor. However, when these channels are full, kerosene enhancement can be observed for this motor design.

The chamber pressure for the motor of Test 6 is hard to directly compare due to the larger initial nozzle size compared to all the other burns. However, a general pressure profile matches somewhat the blank pressure profile. The main difference is several sharp pressure spikes that are observed in the pressure trace, which might indicate release of pockets of kerosene during the burn. See Test 6 of FIG. 11. This chugging of kerosene into the main gas flow is likely to have negative effects on motor performance, and demonstrates a very uneven burn environment.

A small amount of chugging can be observed for Tests 2 and 5 as well. In some embodiments, the channels may be small enough and dispersed enough to smooth out the chugging process in a well-designed liquid hybrid rocket motor. Still, this chugging effect may be unavoidable in certain embodiments. The motor of Test 6 was similar to the motor shown in FIGS. 2A-2D, and was the only motor test with kerosene to hit the targeted O/F near 2.6.

FIG. 13 is a table 1300 illustrating measured parameters for all of the tests, according to an embodiment of the present invention. The burning of the base motor determined the kerosene mass to be added to the second motor. It should be appreciated that both base motor and second motor in these embodiments used the configurations of the motor shown in FIGS. 2A and 2B. The targeted O/F was approximately 2.6, which is a typical ratio for a liquid kerosene/oxygen motor. The base ABS motor had and O/F of 3.51. The 5 g of kerosene should shift the burn to an O/F closer to 2.6, assuming that all of the kerosene is consumed in the burn.

However, the actual measured O/F was extremely fuel rich and well below stoichiometric the targeted O/F. This would account for a larger plume of unspent fuel in the second burn compared to the first. Test 2, as shown in FIG. 12, indicates that the addition of the kerosene causes faster loss of the solid ABS material from the motor, since the O/F shift was more than could be explained by loss of all of the kerosene in the burn. This is not surprising, since the heat of combustion of kerosene is higher than the heat of combustion of ABS plastic (39.84 kJ $g^{-1}$ compared to 46.2 kJ $g^{-1}$). Since the kerosene is already in the liquid phase, the kerosene did not have to undergo the heat of fusion in order to be release into the gas flow.

It should be appreciated, however, that neither Test 5 nor Test 6 indicated significantly larger mass loss of the ABS. This seems to indicate that Test 2 was anomalous, and the extreme mass loss may have been due to burn through that exposed the inner and outer surface to the main gas flow.

While the embodiments and some of the test results show the use of kerosene, it should be readily apparent to a person of ordinary skill in the art that other types of liquid fuel may be used. For example, many commonly used liquid fuels may be employed to similar effect. Some examples may include diesel fuel, RP-1, ethanol, biofuels, such as biodiesel, limonene, vegetable oils, animal fats or oils, liquefied fuel gasses, such as hydrogen, propane, methane, or ethane. Fuels, such as paraffin wax or heptadecane that are solids at or near standard conditions, may be stored in a hybrid rocket motor fuel grain. These fuels may then be liquefied prior to ignition, or burned as a traditional solid fuel grain, depending on operational considerations. It should be further appreciated that this is not a complete list of alternatives, but is shown for purposes of explanation.

In certain embodiments, grains are pre-heated, by extending a heat source through the nozzle, wrapping the grain in a flexible electrical circuit, such as a thin film Kapton, heater, or by incorporating a partially resistive conductor into a 3D-printed grain. In some further embodiments, long chained hydrocarbon liquid fuels, such as heptadecane, are used to allow solid printing and yet retain liquid nature at room temperature.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A liquid rocket motor fuel grain configured to meter flow of a liquid propellant, comprising:
   a motor casing comprising a port and a chamber surrounding the port, the chamber comprises a plurality of chambers;
   a wall separating the port and chamber comprises wax, plastic, polymeric, rubber, elastomeric, metal or composite material configured to burn away, allowing liquid fuel stored within the chamber to be metered into the port as the wall burns away, wherein
   the wall separating the port and chamber is tapered from a head end to a nozzle end to prevent inefficient mixing of the liquid fuel with the oxidizer in, and metering the flow of the liquid fuel into, the port, and
   the tapered port wall is configured to burn in an outward direction and downward direction, wherein
   each of the plurality of chambers are separated by a tapered wall to form conical helix shaped chambers surrounding the port wall, eliminating combustion instability by allowing the liquid fuel to be educted into the port in a prescribed manner when the motor burns radially outward and as top burning surface of the motor regresses towards the nozzle.

2. The liquid rocket motor fuel grain of claim 1, wherein the tapered port wall is configured to burn from the head end to the nozzle end, metering the flow of the liquid fuel into the port.

3. The liquid rocket motor fuel grain of claim 1, wherein each of the plurality of chambers comprise liquid fuel.

4. The liquid rocket motor fuel grain of claim 3, wherein the tapered wall separating each of the plurality of chambers is configured to burn away, metering flow of the liquid fuel over the tapered wall and into the port.

5. The liquid rocket motor fuel grain of claim 1, further comprising:
   one or more additional chambers surround the chamber and the port, and each of the one or more additional chambers comprise liquid fuel.

6. The liquid rocket motor fuel grain of claim 5, wherein a wall is located between each of the one or more additional chambers, and is configured to burn from head end of the motor to nozzle end of the motor, the burning of the wall between the one or more additional chambers meters the flow of the liquid fuel into the port.

7. A liquid rocket motor fuel grain, comprising:
   a liquid-filled fuel grain having a central port, allowing oxidizer to flow through the central port of the liquid-filled fuel grain, wherein
   upon ignition of the liquid-filled fuel grain, a surface surrounding the central port begins to regress, exposing a plurality of chambers comprising liquid fuel, the regression of the surface meters the flow of the liquid fuel into the central port, thereby mixing the liquid fuel with the oxidizer to produce a combustion,
   the surface surrounding the central port is tapered from a head end to a nozzle end to prevent inefficient mixing of the liquid fuel with the oxidizer in, and metering the flow of the liquid fuel into, the central port, and
   the surface is configured to burn in an outward direction and downward direction, wherein
   each of the plurality of chambers are separated by a tapered wall to form conical helix shaped chambers surrounding the port wall, eliminating combustion instability by allowing the liquid fuel to be educted into the port in a prescribed manner when the motor burns radially outward and as top burning surface of the motor regresses towards the nozzle.

8. The liquid rocket motor fuel grain of claim 7, wherein the liquid-filled fuel grain comprises the plurality of chambers comprising the liquid fuel, the plurality of chambers surround the central port.

9. The liquid rocket motor fuel grain of claim 8, wherein the surface separates the central port and the plurality of chambers comprising the liquid fuel.

10. The liquid rocket motor fuel grain of claim 9, wherein the surface comprises a thickness, the thickness is tapered from a head end to a nozzle end, preventing the surface from regressing from the head end to the nozzle end.

11. The liquid rocket motor fuel grain of 7, wherein each of the plurality of chambers are separated by a segmented wall, separating each of the one or more chambers.

12. The liquid rocket motor fuel grain of 11, wherein the segmented wall between each of the plurality of chambers comprises a thickness, the thickness being tapered from the head end to the nozzle end, preventing the segmented wall between each of the one or more chambers from regressing from a head end to a nozzle end.

13. The liquid rocket motor fuel grain of claim 7, wherein the liquid in each of the plurality of chambers comprises a different composition to enhance performance of the hybrid liquid rocket motor.

14. A liquid rocket motor fuel grain ("motor"), comprising:
a liquid-filled fuel grain comprising a central port with a tapered wall to prevent the tapered wall from regressing during ignition of the motor;
a plurality of chambers comprising liquid fuel surrounding the central port, wherein
the liquid fuel is metered into the central port, mixing with oxidizer to produce a combustion, as the tapered wall is regressing during the ignition of the motor, the regression of the tapered wall is outwards and downwards, wherein
each of the plurality of chambers are separated by a tapered wall to form conical helix shaped chambers surrounding the port wall, eliminating combustion instability by allowing the liquid fuel to be educted into the port in a prescribed manner when the motor burns radially outward and as top burning surface of the motor regresses towards the nozzle.

15. The motor of claim 14, wherein the chamber surrounding the central port comprises one or more additional chambers, the one or more additional chambers comprises liquid fuel that is to be metered into the central port during the ignition of the motor.

16. The motor of claim 15, wherein the one or more additional chambers are separated by one or more corresponding segmented walls.

17. The motor of claim 16, wherein the one or more segmented walls are tapered to prevent the segmented walls from quickly regressing.

18. The motor of claim 16, wherein the one or more additional chambers form one or more spiral chambers, one or more conical helix chambers, one or more honeycomb shaped chambers, one or more stacked cone shaped chambers, or a combination thereof, to meter the flow of the liquid fuel into the central port during the ignition of the motor.

* * * * *